United States Patent
Lee et al.

(10) Patent No.: US 10,189,058 B2
(45) Date of Patent: Jan. 29, 2019

(54) APPARATUS FOR REMOVING CHIPS FROM INTERIOR OF PIPE USING PRESSURE DIFFERENCE

(71) Applicant: DONGHWA INDUSTRY CO., LTD., Incheon (KR)

(72) Inventors: Woo Kag Lee, Seoul (KR); Min Ho Song, Daejeon (KR)

(73) Assignee: DONGHWA INDUSTRY CO., LTD., Incheon (KR)

( * ) Notice: Subject to any disclaimer, the term of this patent is extended or adjusted under 35 U.S.C. 154(b) by 64 days.

(21) Appl. No.: 15/391,905

(22) Filed: Dec. 28, 2016

(65) Prior Publication Data
US 2017/0182524 A1 Jun. 29, 2017

(30) Foreign Application Priority Data
Dec. 29, 2015 (KR) .......................... 10-2015-0188398

(51) Int. Cl.
  *B08B 5/04* (2006.01)
  *B08B 9/035* (2006.01)
  *F16L 55/24* (2006.01)

(52) U.S. Cl.
  CPC .............. *B08B 9/035* (2013.01); *B08B 5/04* (2013.01); *F16L 55/24* (2013.01)

(58) Field of Classification Search
  CPC ............ B08B 5/04; B08B 9/035; F16L 55/24
  USPC ...... 134/104.2, 166 C, 166 R, 167 C, 167 R, 134/169 C, 172, 198
  See application file for complete search history.

(56) References Cited

FOREIGN PATENT DOCUMENTS

JP 2013022526 A * 2/2013

OTHER PUBLICATIONS

Nakazato, "JP2013022526A English Machine Translation.pdf", Feb. 4, 2013—Machine translation from Espacenet.com.*

* cited by examiner

*Primary Examiner* — Levon J Shahinian
(74) *Attorney, Agent, or Firm* — Clements Bernard Walker PLLC; Christopher L. Bernard

(57) ABSTRACT

Disclosed is an apparatus for conveniently and rapidly removing chips from the interior of a pipe by discharging chips with a portion of fluid out of the pipe using the difference between the pressure in the pipe and atmospheric pressure. The apparatus includes a fitting mounted to a region adjacent to a hole bored in a pipe, a sandwich valve coupled to the fitting, a chip-removing adapter mounted above the sandwich valve, a suction tube extending to an inner surface of the pipe through the chip-removing adapter in order to remove chips from the pipe, a vertical moving unit for vertically moving the suction tube, a delivery tube connected to an upper end of the suction tube and configured to deliver the chips to a predetermined place, and a strainer mounted to a distal end of the delivery tube in order to separate the delivered chips from the fluid.

4 Claims, 3 Drawing Sheets

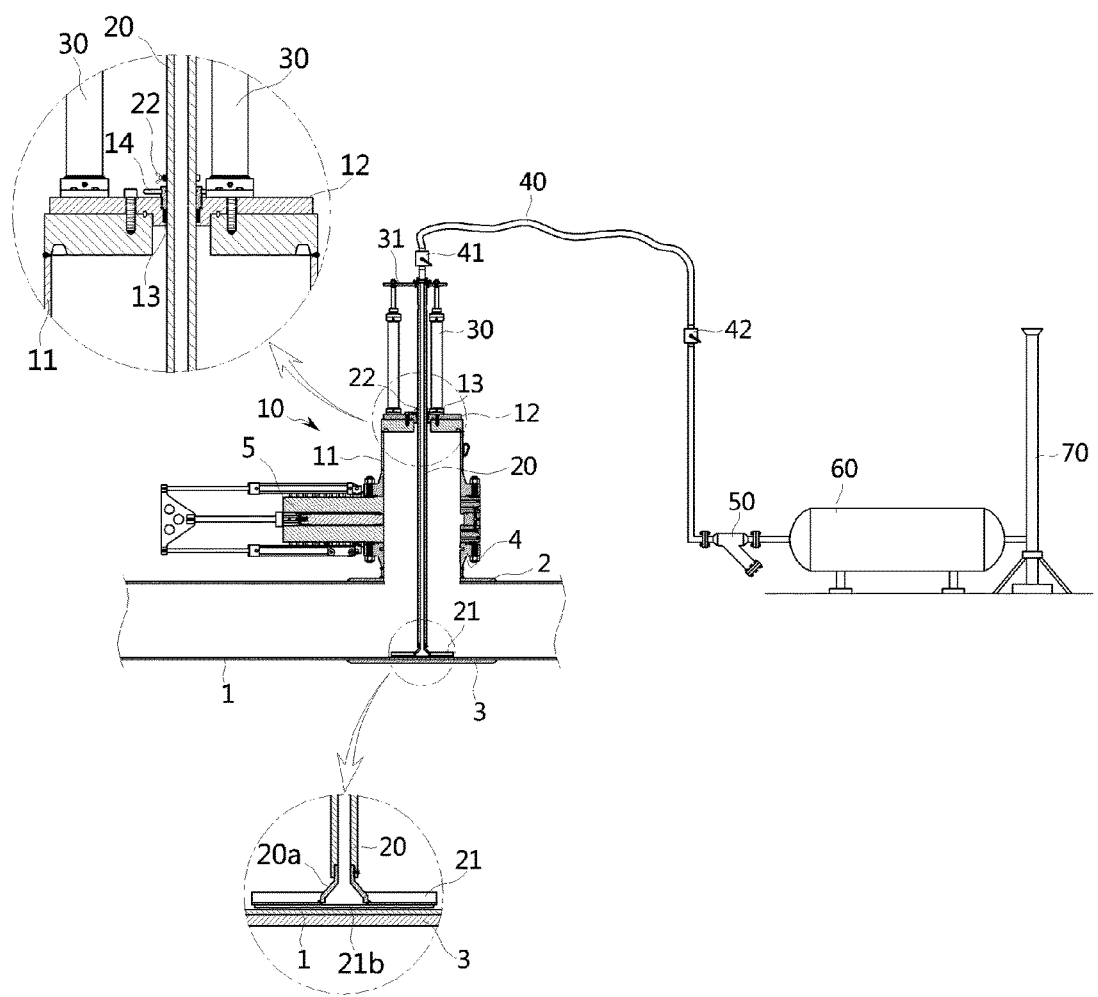
[Fig. 1]

[Fig. 2]
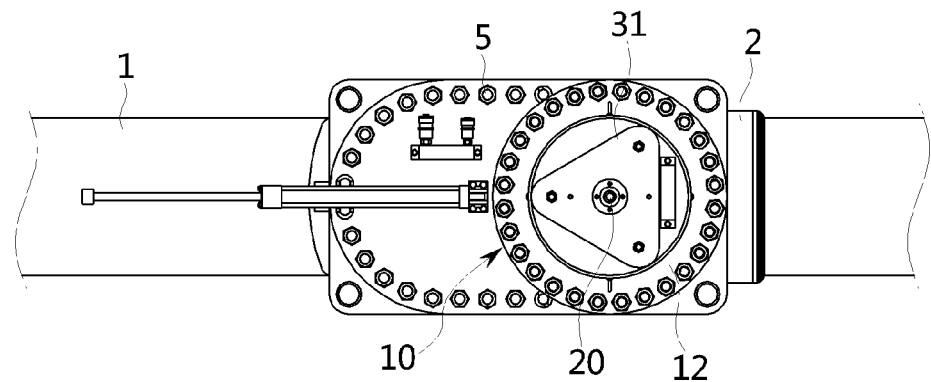
[Fig. 3a]
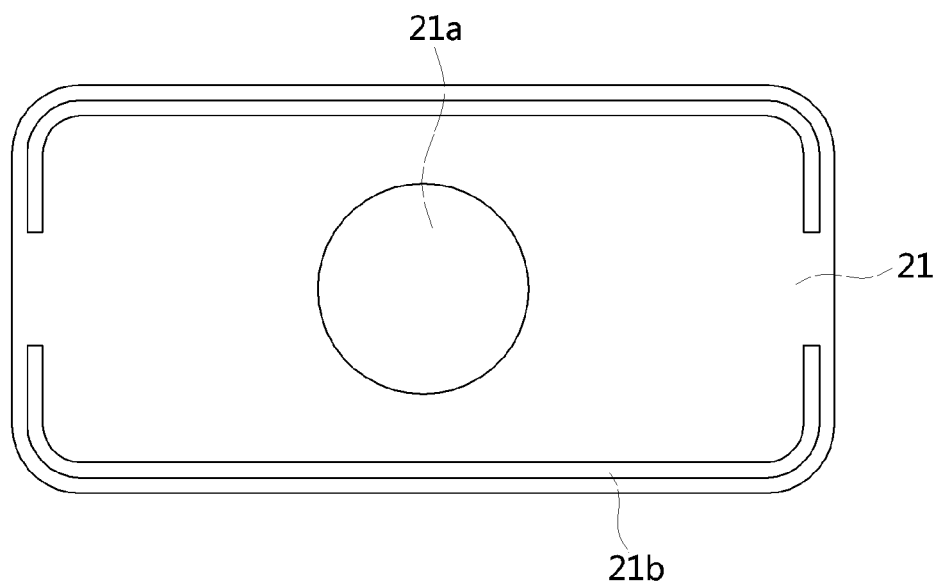
[Fig. 3b]
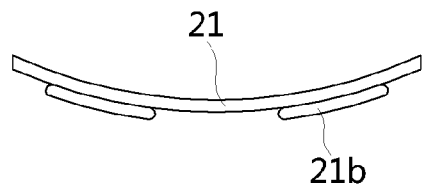

[Fig. 4]
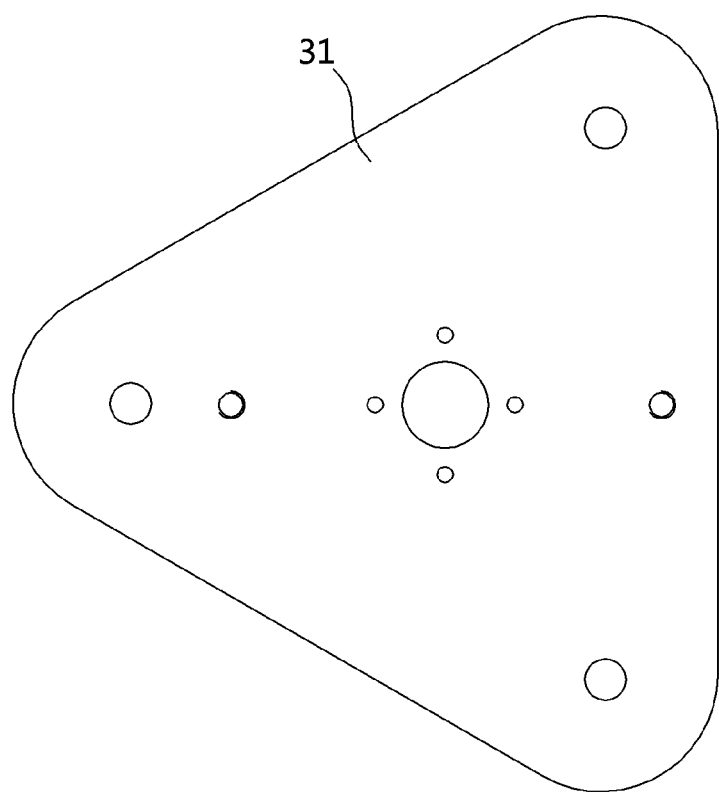

APPARATUS FOR REMOVING CHIPS FROM INTERIOR OF PIPE USING PRESSURE DIFFERENCE

BACKGROUND OF THE INVENTION

Field of the Invention

The present invention relates to an apparatus for removing metal chips from the interior of a pipe, in which metal chips, produced when boring a pipe, such as a gas pipe, through which high-pressure gas flows, a hot water pipe for space heating, and a water supply pipe, are deposited, and more particularly to a chip-removing apparatus capable of conveniently and rapidly removing chips from the interior of a pipe by discharging the chips with a portion of the fluid, such as gas, out of the pipe using the difference between the internal pressure in the pipe and external atmospheric pressure.

Description of the Related Art

In general, gas pipes are laid underground in a residential district so that a gas grid supplies municipal gas to buildings and houses. In addition, a variety of pipes, such as hot water pipes for space heating and water supply and sewage pipes, are laid underground in the form of a web. Such pipes include main pipes, which are connected to supply sources such as a gas grid, and branch pipes, which diverge from the main pipes and extend to places such as houses and buildings in which gas and hot water are needed.

When it is intended to connect a branch pipe to a main pipe or to block a pipe that is located upstream of a maintenance area in order to perform maintenance or repair of a pipe, pipe boring is carried out using a machine suitable for the pipe to be bored.

An exemplary apparatus and method of connecting a branch pipe to a main pipe are disclosed in Korean Patent Application Publication No. 1993-0011585. According to this prior art, when pipe boring is performed, a portion of the pipe is cut out in a circular shape. At this time, metal chips are produced and are deposited in the pipe.

An exemplary apparatus of temporarily shutting off the supply of fluid to an area in which pipe maintenance, such as replacement, repair and branch pipe connection, is performed is disclosed in Korean Utility Model Registration No. 20-0157683. According to this prior art, metal chips are also produced when a portion of the pipe is cut out in a circular shape in a pipe-boring process and are deposited in the pipe.

If the metal chips deposited in the pipe are not removed to the outside, there may be a problem in that the metal chips move with fluid such as gas or hot water through the pipe and block a nozzle mounted in a place where the gas or hot water is ultimately used. Therefore, it is preferable to remove the metal chips from the interior of the pipe.

An exemplary apparatus for removing chips from the interior of a pipe is disclosed in Korean Utility Model Registration No. 20-0153590. According to this prior art, in order to remove chips from the interior of a pipe, a magnet is put into the pipe through a hole bored in the pipe so that the chips adhere to the magnet, and is then pulled out of the pipe.

However, this chip-removing apparatus using a magnet has a shortcoming in that it cannot remove all the chips at one time, and thus the above-described chip-removing process must be repeated four or five times. In most cases, the pipe is a relatively large one having a diameter ranging from one to two meters, and high-pressure fluid flows through the pipe. Therefore, safety measures must be taken before the chip-removing process is performed. In addition, the components of the chip-removing apparatus are typically heavy. Accordingly, it takes a long time to perform each chip-removing process. In other words, the chip-removing apparatus using a magnet is labor-intensive and time-consuming.

SUMMARY OF THE INVENTION

Therefore, the present invention has been made in view of the above problems, and it is an object of the present invention to provide a chip-removing apparatus capable of rapidly and conveniently removing chips from the interior of a pipe by enabling a user to remove the chips deposited in the pipe in a single process.

In accordance with the present invention, the above and other objects can be accomplished by the provision of an apparatus for removing chips from the interior of a pipe including a fitting mounted to a region adjacent to a hole bored in the pipe, through which high-pressure fluid flows, a sandwich valve coupled to the fitting, a chip-removing adapter mounted above the sandwich valve, a suction tube extending to an inner surface of the pipe through the chip-removing adapter in order to remove chips deposited in the pipe, a vertical moving unit for vertically moving the suction tube, a delivery tube connected to an upper end of the suction tube and configured to deliver the chips to a predetermined place, and a strainer mounted to a distal end of the delivery tube in order to separate the delivered chips from the fluid.

The apparatus may further include a silencer mounted to a discharge tube of the strainer and a discharge pipe mounted to a discharge tube of the silencer.

The apparatus may further include a suction plate coupled to a lower end of the suction tube, the suction plate being formed to be curved corresponding to a curved inner surface of the pipe.

The vertical moving unit may include a hydraulic cylinder mounted to the chip-removing adapter and a bracket coupled to a rod of the hydraulic cylinder, to which an upper end of the suction tube is coupled.

The suction tube may be provided with a stopper for limiting a downward moving distance of the suction tube, the stopper being mounted to a portion of the suction tube that is exposed outside the chip-removing adapter.

The chip-removing adapter may include a main body coupled to the sandwich valve, a sealing plate removably mounted to a top of the main body and having therein a through-hole through which the suction tube passes, and a packing for sealing a gap between the sealing plate and the suction tube.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a longitudinal sectional view showing the construction of an apparatus for removing chips from the interior of a pipe according to the present invention;

FIG. 2 is a partial plan view of the apparatus for removing chips from the interior of a pipe according to the present invention;

FIG. 3a is a bottom view of a suction plate of the apparatus for removing chips from the interior of a pipe according to the present invention;

FIG. 3b is a side view of the suction plate in FIG. 3a; and

FIG. 4 is a plan view of a bracket of the apparatus for removing chips from the interior of a pipe according to the present invention.

DETAILED DESCRIPTION OF THE PREFERRED EMBODIMENTS

Hereinafter, an apparatus for removing chips from the interior of a pipe will be described in detail in connection with preferred embodiments of the present invention with reference to the accompanying drawings.

As shown in FIGS. 1 and 2, an apparatus for removing chips from the interior of a pipe according to the present invention comprises a fitting 4, which is mounted to a region adjacent to a hole bored in a pipe 1, through which high-pressure fluid flows, a sandwich valve 5, which is coupled to the fitting 4, a chip-removing adapter 10, a suction tube 20, a vertical moving unit, which vertically moves the suction tube 20, a delivery tube 40, and a strainer 50.

When the pipe 1 is bored, reinforcement plates 2 and 3 are welded to the region adjacent to the hole bored in the pipe and the region opposite the hole, respectively, and the fitting 4 and the sandwich valve 5 are additionally mounted to the pipe 1. These components are maintained in the state of being mounted to the pipe 1 without being demounted from the pipe 1 even after the pipe boring is completed, and are utilized for the chip-removing operation of the chip-removing apparatus of the present invention.

The chip-removing adapter 10 is mounted above the sandwich valve 5. The chip-removing adapter 10 includes a main body 11, which is coupled to the sandwich valve 5, a sealing plate 12, which is removably mounted to the top of the main body 11 and has therein a through-hole through which the suction tube 20 passes, and a packing 13, which seals a gap between the sealing plate 12 and the suction tube 20. The packing 13 includes a plurality of V-packing elements, which are stacked so as to prevent the fluid from leaking between the sealing plate 12 and the suction tube 20, and the mounting state of the packing 13 is securely maintained by a packing cover 14.

The sealing plate 12 is securely coupled to the main body 11 by means of screws. A hydraulic cylinder 30 is provided on the sealing plate 12. The size and volume of the suction tube 20 and the hydraulic cylinder 30 may vary depending on the diameter of the pipe 1. The present invention is capable of being applied to any pipes having various diameters merely by replacing the sealing plate 12 without replacing the main body 11.

In order to remove chips deposited in the pipe 1, the suction tube 20 extends from the inner surface of the pipe 1 to the outside through the chip-removing adapter 10. The suction tube 20 is provided with a suction tip 20a, which has a funnel shape and is connected to the lower end of the suction tube 20.

As shown in FIGS. 3a and 3b, a suction plate 21, which is formed to be curved corresponding to the curved inner surface of the pipe 1, is coupled to the lower end of the suction tip 20a. The suction plate 21 has a through-hole 21a formed in the center portion thereof and a guide protruding portion 21b formed on the edge portion of the bottom surface thereof. The guide protruding portion 21b functions to collect chips into the region surrounded thereby, and has openings formed in the middle portions of the left and right sides thereof. Therefore, when the chip-removing operation is performed, the fluid is strongly introduced into the suction tube 20 through the openings formed in the left and right sides of the guide protruding portion 21b and the gap between the guide protruding portion 21b and the pipe 1, and at the same time the chips deposited in the pipe 1 are also sucked into the suction tube 20.

The vertical moving unit is connected to the suction tube in order to move the suction tube 20 vertically. The vertical moving unit includes the hydraulic cylinder 30, which is mounted to the sealing plate 12 of the chip-removing adapter 10, and a bracket 31, which is coupled to a rod of the hydraulic cylinder 30 and to which the upper end of the suction tube 20 is coupled.

Preferably, in order to move the suction tube 20 vertically without wobbling from side to side, three hydraulic cylinders 30 are arranged equidistant from each other, and the bracket 31, as shown in FIGS. 2 and 4, is embodied as a triangular-shaped plate such that the distal ends of the hydraulic cylinders 30 are coupled to the corners of the bracket 31 and the upper end portion of the suction tube 20 passes through the center portion of the bracket 31.

The hydraulic cylinder 30 may be replaced by an air cylinder, and may be preferably embodied as a multi-stage cylinder because the vertical moving distance of the suction tube 20 is long.

The suction tube 20 is provided with a stopper 22, which is mounted to the portion of the suction tube 20 that is exposed outside the chip-removing adapter 10 in order to limit the downward moving distance of the suction tube 20. The stopper 22 is structured such that a stopper ring, which is disposed on the outer surface of the suction tube 20, is secured to the suction tube 20 by fastening a butterfly bolt to the stopper ring.

The delivery tube 40 is connected to the upper end of the suction tube 20 and functions to deliver chips to a predetermined place. The delivery tube 40 is provided with opening/closing valves 41 and 42.

The strainer 50 is mounted to the distal end of the delivery tube 40 in order to separate the delivered chips from the fluid. The fluid, from which the chips are separated by the strainer 50, is discharged from the strainer 50. When a predetermined amount of chips are collected in the strainer 50, the strainer 50 is demounted from the chip-removing apparatus and is discarded.

In the case in which the fluid is directly discharged to the air from the strainer 50, a loud noise may be generated. Therefore, a silencer 60 is mounted to a discharge tube of the strainer 50. In addition, a discharge pipe 70 is mounted to a discharge tube of the silencer 60 so that the fluid is discharged from a position higher than the ground.

Hereinafter, the operation of the chip-removing apparatus according to the present invention constructed above will be described with reference to a gas pipe as the pipe 1.

In the state in which the sandwich valve 5 is in a closed state, the chip-removing adapter 10, to which the suction tube 20 and the hydraulic cylinder 30 are coupled, is mounted to the sandwich valve 5, and the delivery tube 40, which is connected with the strainer 50, is connected to the upper end of the suction tube 20. In this state, the suction plate 21 is located in the chip-removing adapter 10.

Next, the sandwich valve 5 is opened, and the bracket 31 and the suction tube 20 are moved downwards slowly by the operation of the hydraulic cylinder 30. When the suction plate reaches a predetermined position, the operation of the hydraulic cylinder 30 is stopped. The suction plate 21 may move further downwards together with the suction tube 20 due to its own weight. However, when the stopper 22 comes into contact with the sealing plate 12, the suction plate 21 is prevented from moving further downwards. In this state, chips are located in the region below the suction plate 21, specifically, the region surrounded by the guide protruding portion 21b.

Subsequently, the opening/closing valves 41 and 42 provided at the delivery tube 40 are opened. The gas flows from the region below the suction plate 21 to the strainer 50 via the suction tube 20 and the delivery tube 40 due to the pressure in the pipe 1. At the same time, the chips located in the region below the suction plate 21 are also delivered with the gas to the strainer 50. The chips may be smoothly sucked into the suction tube 20 without great resistance by virtue of the funnel-shaped suction tip 20a, which is connected to the lower end of the suction tube 20.

The chips are separated from the gas by the strainer 50, and the gas passes through the silencer 60, which reduces the noise generated by discharge of the gas, and is then discharged from the outlet of the discharge pipe 70, which is located at a position higher than the ground. In the case in which the fluid is hot water for space heating or water for drinking or other purposes, the silencer 60 or the discharge pipe 70 need not be provided.

When the above-described chip-removing process is finished, the opening/closing valves 41 and 42 of the delivery tube 40 are closed in order to move the hydraulic cylinder 30 upwards. The suction plate 21 is pulled upwards into the chip-removing adapter 10, and the sandwich valve 5 is closed in order to completely shut off the discharge of the fluid. Then, the chip-removing adapter 10 is removed from the sandwich valve 5, thereby completing the chip-removing operation.

After the chip-removing operation, the strainer 50, in which the chips are collected, is demounted from the chip-removing apparatus, and the chips are discarded.

As is apparent from the above description, the present invention provides a chip-removing apparatus that discharges chips with a portion of high-pressure fluid out of a pipe using the difference between the high hydraulic pressure in the pipe and external atmospheric pressure, thereby enabling a user to rapidly and conveniently remove chips from the interior of the pipe in a single chip-removing process.

Although the preferred embodiments of the present invention have been disclosed, those skilled in the art will appreciate that various modifications, additions and substitutions are possible, without departing from the scope and spirit of the invention as disclosed in the accompanying claims.

What is claimed is:

1. An apparatus for removing chips from an interior of a pipe, having a fitting mounted to a region adjacent to a hole bored in the pipe, through which high-pressure fluid flows, and a sandwich valve coupled to the fitting, the apparatus comprising:
    a chip-removing adapter mounted above the sandwich valve;
    a suction tube extending to an inner surface of the pipe through the chip-removing adapter in order to remove chips deposited in the pipe;
    a vertical moving unit for vertically moving the suction tube;
    a delivery tube connected to an upper end of the suction tube and configured to deliver the chips to a predetermined place; and
    a strainer mounted to a distal end of the delivery tube in order to separate the delivered chips from the fluid;
    wherein a lower end of the suction tube comprises a suction tip having a funnel shape and a suction plate is coupled to the suction tip, wherein the suction plate is formed to be curved corresponding to a curved inner surface of the pipe; and
    wherein the suction tube is provided with a stopper for limiting a downward moving distance of the suction tube, the stopper being mounted to a portion of the suction tube that is exposed outside the chip-removing adapter.

2. The apparatus according to claim 1, further comprising:
    a silencer mounted to a discharge tube of the strainer; and
    a discharge pipe mounted to a discharge tube of the silencer.

3. The apparatus according to claim 1, wherein the vertical moving unit includes a hydraulic cylinder mounted to the chip-removing adapter and a bracket coupled to a rod of the hydraulic cylinder, to which an upper end of the suction tube is coupled.

4. The apparatus according to claim 1, wherein the chip-removing adapter includes a main body coupled to the sandwich valve, a sealing plate removably mounted to a top of the main body and having therein a through-hole through which the suction tube passes, and a packing for sealing a gap between the sealing plate and the suction tube.

* * * * *